United States Patent

Skahen

[15] 3,687,468
[45] Aug. 29, 1972

[54] SPRING ACTUATED RELEASE OF CONTRACTING COLLET CHUCKS FOR LATHES AND THE LIKE

[72] Inventor: Don H. Skahen, New Fairfield, Conn.

[73] Assignee: The Dunham Tool Company, Inc., New Fairfield, Conn.

[22] Filed: Oct. 16, 1970

[21] Appl. No.: 81,483

[52] U.S. Cl. .................................. 279/51, 279/1 S
[51] Int. Cl. ........................................... B23b 31/20
[58] Field of Search .......................... 279/1 S, 1 E, 51

[56] References Cited

UNITED STATES PATENTS 3,510,141  5/1970  Dunham ..................... 279/51

Primary Examiner—Andrew R. Juhasz
Assistant Examiner—Michael Koczo, Jr.
Attorney—Mandeville & Schweitzer

[57] ABSTRACT

The invention relates to improvements in the actuation of collet chucks for lathes and the like. Specifically, the invention provides for a novel and highly simplified, yet effective spring return mechanism for effecting axial movement of a collet chuck, to release a workpiece after a turning operation. The mechanism of the invention is applicable particularly to standard, manually operated turning machines, which are typically provided with a manual facility (a lever or the like) for actuating the collet in a closing direction, but are not functional in opening of the collet. The arrangement of the invention provides a novel spring, which effectively acts between the front face of the lathe spindle and the rear portion of the collet chuck to urge the collet chuck in an axially forward direction and thereby effect release of the workpiece when desired.

11 Claims, 7 Drawing Figures

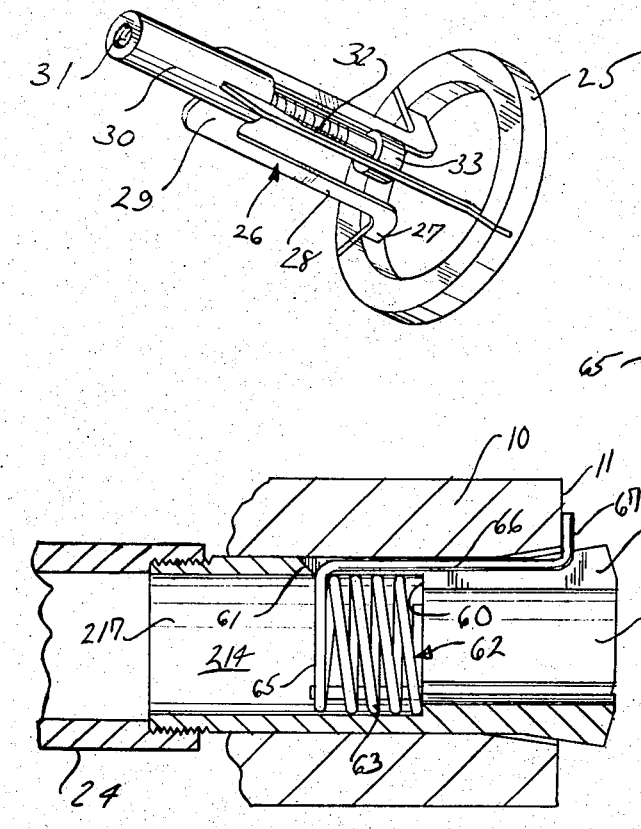
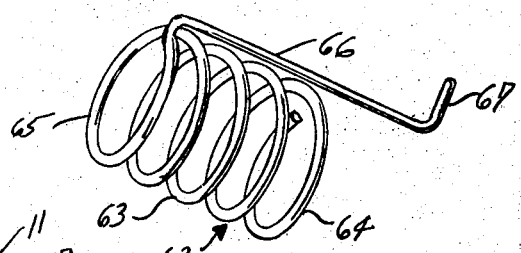
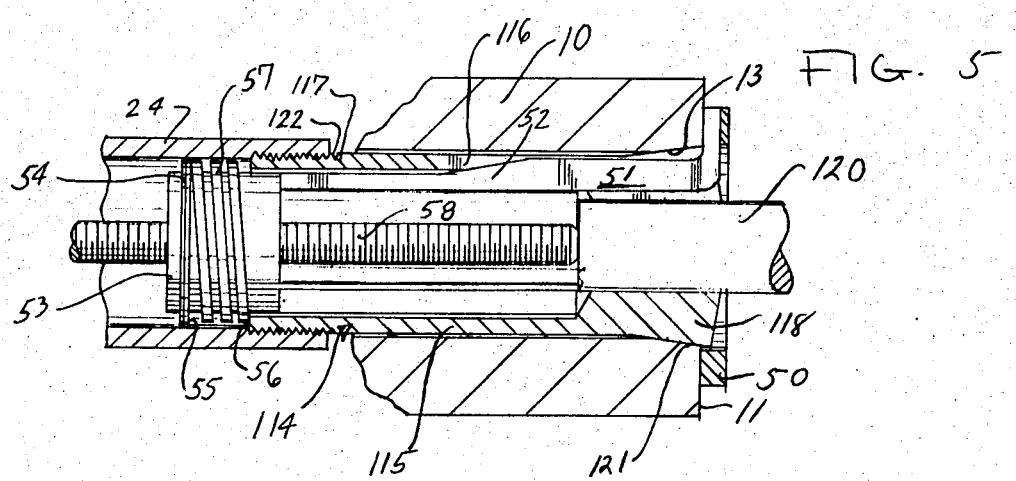

SPRING ACTUATED RELEASE OF CONTRACTING COLLET CHUCKS FOR LATHES AND THE LIKE

BACKGROUND AND SUMMARY OF THE INVENTION

Conventional lathes and similar turning machines often utilize collet chuck devices for the gripping of workpieces. Typically, the collet chuck is of tubular construction and is provided with a plurality of radial slots extending from its forward extremity toward the rear of the collet. The rear extremities are, however, left circumferentially intact. The slotted forward portion of the collet thus forms a plurality of flexible gripping fingers. The collet chuck is slidably received within the bore of a hollow lathe spindle, and the forward portions of the spindle and collet are provided with complimentary conical surfaces which, when the collet chuck is actuated in a rearward direction relative to the spindle, cause the gripping fingers to be displaced radially inward into tight, gripping engagement with a workpiece.

In a conventional turning machine, a draw tube extends longitudinally throughout the hollow lathe spindle and engages the rearward end extremity of the collet chuck, typically by external threads on the chuck engaging with internal threads on the draw tube. The collet chuck thus may be actuated by axial movements of the draw tube.

In some of the more complex and expensive models of turning machines, the draw tube of the lathe is arranged to be actuated by a double acting mechanism, typically a hydraulic cylinder, so that both opening and closing movements of the collet chuck are under direct operative control. In the simpler, manual machines, however, there is more typically provided a manual lever at the rear of the lathe which engages the rear of draw tube with an appropriately high mechanical advantage and enables the draw tube to be drawn axially rearward for gripping of the workpiece. Typically, however, the manual means provided for this purpose is not double acting. Rather, the axially directed component forces derived from the interaction of conical surfaces on the lathe spindle and collet chuck are relied upon for opening of the chuck when the closing lever is released. Such arrangements are generally unreliable, however, because of the substantial friction forces involved, and it is routinely required that the operator provide some additional opening force, such as walking to the rear of the machine and tapping forwardly on the draw tube. This is both inconvenient and time consuming, as will be readily appreciated.

In accordance with the present invention, a novel and improved collet chuck arrangement is provided which includes a special spring arrangement for urging the collet chuck forwardly, relative to the lathe spindle, when rearward axial force on the draw tube is released. This is accomplished within the significant physical limitations imposed by lathes and collet chuck of conventional configuration by arranging the spring to act against the forward face of the lathe spindle and against a rearward facing shoulder of the collet chuck, with means extending axially through one or more of the slots of the chuck for interconnecting the front and rear portions of the device or mechanism.

In certain especially advantageous forms of the invention the releasing spring facility is incorporated with a workpiece positioning assembly, to provide an advantageous interaction of the component functions. In this respect, in certain particularly advantageous forms of workpiece devices, described and claimed in the Dunham U.S. Pat. No. 3,510,141 and in the co-pending application Ser. No. 81,397 of Russell H. Dunham et al., the workpiece stop itself includes a positioning element engaging the front face of the lathe spindle and connecting elements extending rearwardly along the slots of the collet chuck. In accordance with the present invention, the elements thus provided for workpiece positioning can be advantageously utilized to transmit the forces of the releasing spring means from the front of the lathe spindle to an appropriate rearwardly facing shoulder of the collet chuck.

In a highly simplified form of the invention, useful particularly where no work positioning capability is required, a simple, specially shaped spring device is provided with a positioning element at its forward extremity, arranged to bear against the forward surface of the lathe spindle, and a connecting extension which passes along a slot of the collet chuck to a compressible coil spring portion recessed within the collet chuck and acting against a rearwardly facing shoulder therein.

In any of its forms, the device of the invention provides a simple, inexpensive and reliable facility for assisting in the release of a workpiece from a manually operated, single-acting collet chuck actuating system.

For a better understanding of the above and other advantageous features of the invention, reference should be made to the following detailed description and to the accompanying drawing.

DESCRIPTION OF THE DRAWING

FIG. 4, is a perspective view of the workpiece stop assembly incorporated in the apparatus of FIGS. 1–3.

FIG. 5, is a fragmentary longitudinally cross-sectional view, similar to FIG. 3, illustrating the features of the invention in conjunction with a modified form of workpiece stop device.

FIG. 6, is a fragmentary longitudinally cross-sectional view of a collet chuck arrangement according to the invention, provided with a work-releasing spring arrangement independent of workpiece positioning means.

FIG. 7, is a perspective view of the actuating spring element incorporated in the mechanism of FIG. 6.

DESCRIPTION OF PREFERRED EMBODIMENT OF THE INVENTION

Figure 1:
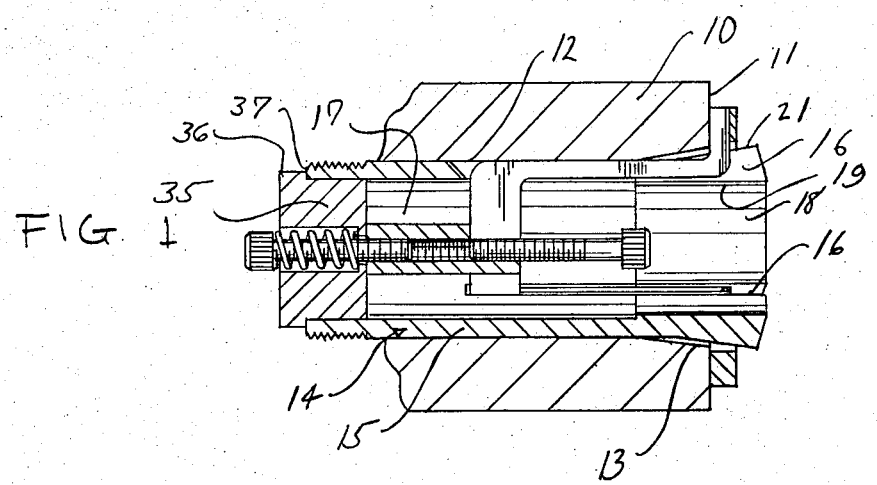
FIG. 1, is a fragmentary longitudinally cross-sectional view illustrating a lathe spindle and collet chuck incorporating the workpiece releasing arrangements of the invention.

Referring now to the drawings, and initially to FIGS. 1–4 thereof, there is shown a spring actuated collet chuck assembly, in which the spring releasing mechanism is associated in combination with a workpiece device of the general type described and claimed in the Russell H. Dunham, U.S. Pat No. 3,510,141. The illustrated arrangement includes a spindle 10, which is conventionally supported for rotation in a lathe or similar turning machine (not shown). The spindle is formed with a front face 11 and a central longitudinal bore 12 having a conically divergent portion 13 in its forward extremity. Slidably received in the spindle bore 12 is a collet chuck 14, which is formed with a tubular cylindrical body 15 provided with a plurality of axially extending slots 16. Typically, there may be three slots in radial orientation, separated by angles of about 120°. The slots extend toward but not completely to the rearward end of the collet chuck, leaving a rear portion 17 of the chuck circumferentially intact. The arrangement is such as to provide a plurality (three in the illustration) of resiliently supported gripping fingers 18.

Figure 2:
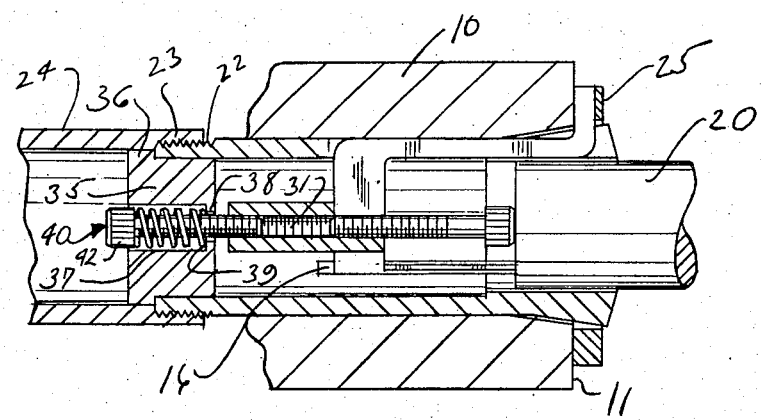
FIG. 2, is a fragmentary cross-sectional view, similar to FIG. 1, illustrating a draw tube attached to the collet chuck and illustrating a workpiece positioned, ready to be gripped by the collet.
Figure 3:
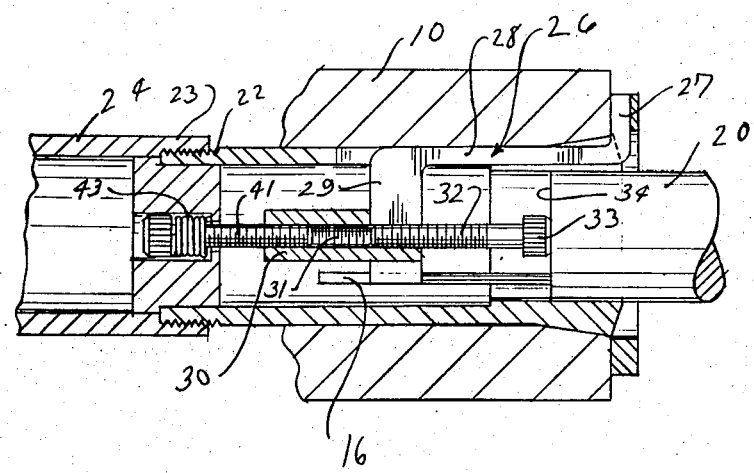
FIG. 3, is a cross-sectional view similar to FIG. 2, with the parts actuated to a position for gripping of the workpiece.

Conventionally, the collet chuck 14 is provided with a cylindrical internal bore 19 in its outer portion, which is just slightly larger than the diameter of a workpiece 20 (FIGS. 2 and 3). The outer forward portion of the collet chuck is provided with a divergent conical surface 21 arranged for cooperation with the conical surface 13 of the spindle whereby, when the collet chuck is drawn axially into the spindle (to the left in FIGS. 1-3) the resilient fingers 18 of the chuck are caused to contract radially and exert a gripping force upon the workpiece 20.

At the back extremity of the collet, threads 22 are provided for cooperation with the threaded forward end 23 of a draw tube 24. The draw tube 24 conventionally is slidably received within the central bore of the lathe spindle 10 and is arranged to be actuated from the back of the lathe. In a typical machine in which the present invention can be most usefully employed, the draw tube 24 is arranged to be actuated in a rearward direction by a lever or similar device (not shown) provided with the machine. The forward force component, derived from the cam action of the conical surfaces 13,21 on lathe spindle and collet chuck respectively, is utilized, but provides an unreliable bases for effecting release of the workpiece.

In the form of the apparatus illustrated in FIGS. 1-3 the mechanism includes a workpiece stop or positioning device, comprising a positioning ring 25, surrounding the outer end of the collet chuck and seated tightly against the front face 11 of the spindle. The positioning ring 25 mounts a plurality of supporting fins 26. The fins have outer arms 27 secured to the ring 25, axial connecting elements 28, which extend along the collet slots 16, and inner arms 29 which extend radially inward and rigidly support a pedestal 30. The pedestal 30 is located behind the workpiece supporting area of the chuck and is provided with a threaded internal bore 31 which receives a threaded work stop 32, typically in the form of an Allen head screw or the like. The head 33 of the work stop forms a seat against which the rearward face 34 of the workpiece 20 is engaged for proper positioning, all as more fully described in the beforementioned Dunham U.S. Pat. No. 3,510,141.

In accordance with the invention, the collet chuck of FIGS. 1-3 is provided in its rearward end extremity with a plug 35 having a flange 36 which seats against the rearward face 37 of the collet chuck. As reflected in FIGS. 2 and 3, the forward portion of the plug 35 is of a diameter to fit snugly within the end of the collet chuck, while the diameter of the flange 36 is such as to be received within the interior of the draw tube 24. In the center of the plug 35 there is an axial bore 37 which extends from the rear face of the plug part way, but not entirely, through to the front face. The bore 37 connects with a second, smaller diameter bore 38, forming a rearwardly facing shoulder 39 at the forward extremity of the larger bore.

A headed bolt 40 is received in the bore 37, and its threaded portion 41 extends through the smaller diameter bore 38 and into the threaded bore 31 of the work pedestal 30. A compressible coil spring 43 is received in the enlarged bore 37 and is contained between the enlarged head 42 of the bolt and the rearwardly facing shoulder 39 of the collet chuck end plug 35.

In accordance with the invention, when the collet chuck and work stop facility are assembled together and engaged by the plug 35 bolt 40 and spring 43, the headed bolt 40 has a predetermined reference to the work stop pedestal 30 and thus is fixed in relation to the front face of the lathe spindle when the positioning ring 25 is seated thereagainst. Thus, as reflected in FIG. 1, when the positioning ring 25 is seated against the spindle face and the collet chuck 14 is moved rearwardly into light engagement with the spring 43, the chuck will be urged to a position spaced well forward of the point at which the conical surfaces 13, 21 become engaged. When the draw tube 24 subsequently is engaged with the collet chuck and held in its normal forward or work releasing position, the collet chuck 14 is drawn slightly rearward into the lathe spindle, placing the spring 43 under some degree of compression. The collet chuck, however, may still be forward of the position in which the conical surfaces 13, 21 become engaged.

When the draw tube 24 is actuated to the left, causing the collet chuck to grip the workpiece 20, the plug 35 is drawn rearwardly with the collet chuck, while the headed bolt 40 remains in its fixed reference position. This causes the spring 43 to be fully compressed, as reflected in FIG. 3 when the workpiece is gripped. When the draw tube 24 subsequently is released, the spring 43 acts forwardly on the plug 35 and thereby forwardly on the collet chuck 14, and rearwardly against the lathe spindle 10, through the headed bolt 40 and the positioning ring 25. Experience has demonstrated that the forward force of a spring of practical dimensions, readily capable of reception within the interior of a typical collet chuck, is sufficient to reliably move the collet chuck forward toward its opening position and effect release of the workpiece 20 when the draw tube 24 is released at the rear of the lathe.

The headed bolt 40 provides an advantageous forwardly facing abuttment surface for the spring 43, in that it enables the initial compression of the spring to be properly adjusted. In this respect, a particular advantage of the arrangement of the invention, when combined with a workpiece stop assembly in the manner indicated, is that, when the collet and workpiece stop assembly are inserted in the lathe spindle and connected to the draw tube 24, a properly adjusted assembly provides an automatic rearward bias on the positioning ring 25, to assure that it is properly seated against the front face of the lathe spindle. Thus, not only does the arrangement provide for reliable opening movement of the collet chuck, but it also provides extremely simple arrangement for biasing the work stop positioning ring snugly against the reference surface 11 of the lathe spindle.

The modification of FIGS. 1–4 is intended especially for use with work stop devices capable of being inserted into the collet chuck through its forward opening. In this respect, as will be derived from FIG. 4, the cylindrical pedestal 30 is of a size and shape to be received in the forward work opening of the collet chuck, with the supporting fins 26 being received within the slots 16. This modification is useful to greatest advantage where the workpiece to be gripped are relatively larger diameter.

In the modification of FIG. 5, a collet release spring is incorporated with a work stop device, but the work stop device is of a design which is useful to greatest advantage with collets intended for the gripping of workpieces of relatively small diameter. Details of the work stop device itself form the subject matter of the beforementioned co-pending application Ser. No. 81,397 of Russell H. Dunham et al.

In the FIG. 5 device, a collet chuck 114 is received in a lathe spindle 10 and arranged to grip a workpiece 120, which may be of relatively small diameter. The collet chuck 114, except for its capability of gripping smaller workpieces, is of the same general construction as the collet 14 of the modification of FIGS. 1–3. Thus, the collet has a generally cylindrical body 115 provided with a plurality of axial slots 116 in its forward portion and a rear portion 117 which is circumferentially intact. The inner end extremity of the collet is threaded at 122 for engagement by a draw bar 24. As in the case of the prior embodiment, the spindle 10 is provided with a conical forward opening 13 for engagement with a conical outer surface portion 121 of the collet to effect closing action of the collet gripping fingers 118 upon axial retracting movement of the collet by the draw bar 24.

As described in detail of the beforementioned co-pending application, the work stop device of the FIG. 5 modification includes a positioning ring 50, adapted to be seated against the front face 11 of the spindle and which carries a plurality of L-shaped supporting fins 51. The fins 51 have elongated, axially connecting portions 52 which extend along the collet slots 116 and then through the interior of the circumferentially intact portion 117 of the collet. Adjacent the rearward extremity of the collet the elements 52 are received in a slotted pedestal member 53 and secured therein by a snap-ring 54. The pedestal element has its forward portion received within the collet body and extends rearward therefrom a short distance, such that the snap-ring 54 forms a forwardly facing shoulder 55 spaced from the rearwardly facing shoulder 56 formed by the back surface of the collet body. A compression spring 57 is received in the small annular space between the pedestal 53 and the interior of the draw tube 24 and acts between the respective shoulders 55,56. An adjustable stop member 58 is threadedly received in the pedestal 53, and its forward end provides a reference surface against which the workpiece 120 can be seated.

As in the case of the embodiment of FIGS. 1–4, the spring 57 in the assembled modification of FIG. 5 serves a dual function, when the draw tube 24 is properly attached to the collet, of resiliently seating the positioning element 50 against the front face of the spindle and of urging the collet in a forward or work-releasing direction when gripping force is released from the draw tube 24.

When the mechanism of FIG. 5 is in its assembled but non-gripping condition, there is only a slight compression on the spring 57, just sufficient to properly seat the ring 50. However, when the draw tube 24 is drawn to the left, to draw the collet 114 into the spindle and firmly grip the workpiece, the spring 57 is further compressed and provides a substantial opening force acting forwardly against the back surface 56 of the collet, which is effective when the draw tube 24 subsequently is released. As will be observed, the compressible coil spring 57 effectively acts between the spindle 10 and the back of the collet through the intervening agency of the positioning ring 50 and connecting elements 52, by which the snap-ring 54 is held in fixed relation to the front surface 11 of the spindle.

In both of the embodiments thus far described, the collet opening spring facility is incorporated in an advantageous combination with a work stop device. However, for many applications of the collet chuck device precise axial positioning of the workpiece is not a critical requirement, and the workpiece stop facility is not necessary. In such instances, the modification of FIGS. 6 and 7 may be utilized to advantage. In the modification, the spring device itself has portions acting respectively on rearwardly facing surfaces of the collet and forwardly facing surfaces of the lathe spindle, and these portions of the spring are connected by a further portion of the spring which extends axially through the slots of the collet. Thus, as shown in FIG. 6, and otherwise generally conventional collet 214 is provided with a conventional work-opening 219 which extends partway through the collet and joins with an enlarged tubular portion 217 at the rear. A rearwardly shoulder 60 is formed in the collet in the region where the collet openings 219, 217 meet. In accordance with the invention, the shoulder 60 is located forwardly of the rearward extremities 61 of the axial collet slots 216.

The collet of FIG. 6 has inserted therein a work-releasing spring generally designated by the numeral 62. The spring includes a compressible coil spring body 63 the forward convolution 64 of which is arranged to be seated against the collet shoulder 60. Desirably, the internal diameter of the spring-body 63 is at least as large as the diameter of the work-opening 219 of the collet, enabling the workpiece to pass through the spring and well into the rear portion of the collet chuck, if desired. The rearward convolution 65 of the spring joins an integral connecting portion 66, which extends axially along the outer surfaces of the spring-body 63 and then joins with an integral positioning element 67, which extends radially outward from the connecting portion.

As reflected in FIG. 6, when the spring 62 is properly positioned within the collet, the connecting element 66 extends forward from the rear spring convolution through one of the axially extending collet slots 216. The positioning element 67 then extends radially outward through the slot and is arranged to engage the front surface 11 of the lathe spindle 10.

According to the invention, when the collet chuck 214 is properly engaged by the draw tube 24, but in the open or work-release position, there advantageously is at least a slight compression in the spring-body 63 urging the collet in the work releasing direction. When the collet subsequently is drawn into the spindle, to effect clamping of a workpiece, the rearward convolution of the spring is held by the positioning element 67 acting on the front face 11 of the spindle, while the front convolution 64 moves to the rear with the collet. Accordingly, the spring-body 63 is substantially compressed and a significant force is applied to the collet in the work-releasing direction, which becomes effective when the draw tube 24 subsequently is released.

The modification of FIGS. 6 and 7 is extremely simple and economical, and is capable of being easily assembled with the collet through the back opening 217 thereof. At least in conjunction with collets having work openings substantially smaller than the back opening. In some cases, where the work opening is nearly as large as the back opening, it may be expedient to provide for assembly through the front opening, the spring 62 in either case being capable of the necessary temporary deformations to accommodate assembly.

The present invention, in any of its several modifications, provides an extremely simplified, reliable and economical facility for effecting release of a workpiece, gripped in a collet chuck device in a standard, manually operated lathe chuck arrangement. In cases where a work stop device is desired to be associated with the collet, the work-releasing spring mechanism is combined to great advantage with the work stop such that, in the work-releasing position of the collet, the spring serves to assure proper positioning of the work stop, and, in the work-gripping position of the collet, the spring serves to provide the desired opening force on the collet. For applications where the work stop is either unnecessary or undesirable, an extremely simple coil-spring device may be inserted in the collet, arranged to act forwardly on a rearwardly facing shoulder provided internally of the collet and having a positioning element adapted for engagement with the front face of the lathe spindle for compressing the spring when the collet chuck is withdrawn axially into the spindle for gripping the workpiece.

It should be understood, of course, that the several specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. A self-releasing collet chuck assembly for use in combination with a lathe or the like of the type having a hollow spindle provided with a conically flared outer end, a draw tube slidably received in the spindle and engageable with the rear portion of the collet, comprising
    a. a tubular collet chuck having a circumferentially intact rear portion and a radially slotted forward portion defining a plurality of clamping fingers,
    b. the forward extremities of the clamping fingers being outwardly flared for cooperative engagement with the flared portions of the spindle, to effect clamping and releasing movements of said fingers in response to respective rearward and forward movements of the collet chuck,
    c. first reference means engaging a forwardly facing surface at the front of the lathe spindle,
    d. second reference means engaging a rearwardly facing surface of the collet chuck in a region spaced rearward of the forward extremities of the chuck, and
    e. biasing means, including spring means, interconnecting the respective first and second reference means and functioning to urge said second reference means, and therefore said collet chuck, in a forward direction in all operative positions of the chuck within said spindle,
    f. said biasing means including one or more connecting elements engaging said first reference means and extending rearwardly,
    g. said connecting elements passing through the radial slots in said collet chuck.

2. The collet chuck assembly of claim 1, further characterized by
    a. said first reference means comprising a ring-like element surrounding the forward portions of the collet chuck and bearing against the front face of the lathe spindle, and
    b. said connecting elements comprising a plurality of flat, thin elements extending rearwardly from the ring-like reference element and received within the slots of the collet chuck.

3. A self-releasing collet chuck assembly for use in combination with a lathe or the like of the type having a hollow spindle provided with a conically flared outer end, a draw tube slidably received in the spindle and engageable with the rear portion of the collet, comprising
    a. a tubular collet chuck having a circumferentially intact rear portion and a radially slotted forward portion defining a plurality of clamping fingers;
    b. the forward extremities of the clamping fingers being outwardly flared for cooperative engagement with the flared portions of the spindle, to effect clamping and releasing movements of said fingers in response to respective rearward and forward movements of the collet chuck;
    c. a ring-like element surrounding the forward portions of the collet chuck and bearing against the front face of the lathe spindle;
    d. a plug-like element slidably received in the rear portions of the collet chuck and projecting therefrom;
    e. means on said plug-like element forming a forwardly facing shoulder;
    f. a plurality of flat-thin connecting elements extending rearwardly from said ring-like element and received in the slots of the collet chuck, said elements being fixed to said plug-like element;
    g. a compressible coil spring received in an annular space between said plug-like element and the interior of a lathe draw tube, and
    h. said spring acting rearwardly against said forwardly facing shoulder and forwardly against the rearwardly facing surface of the collet chuck.

4. The collet chuck assembly of claim 3, further characterized by a. said rearwardly facing surface of the collet chuck comprising the rearward extremity thereof, and
b. said compressible coil spring having an external diameter exceeding the internal diameter of like circumferentially intact rear portion of the collet chuck.

5. The collet chuck assembly of claim 3, further characterized by
a. the means forming said forwardly facing shoulder on said plug-like element comprising an annular snap ring.

6. A self-releasing collet chuck assembly for use in combination with a lathe or the like of the type having a hollow spindle provided with a conically flared outer end, a draw tube slidably received in the spindle and engageable with the rear portion of the collet, comprising
(a) a tubular collet chuck having a circumferentially intact rear portion and a radially slotted forward portion defining a plurality of clamping fingers;
(b) the forward extremities of the clamping fingers being outwardly flared for cooperative engagement with the flared portions of the spindle, to effect clamping and releasing movements of said fingers in response to respective rearward and forward movements of the collet chuck;
(c) a ring-like element surrounding the forward portions of the collet chuck and bearing against the front face of the lathe spindle;
(d) a plurality of flat-thin connecting elements extending rearwardly from said ring-like element and received in the slots of the collet chuck;
(e) means secured to said connecting elements at the ends thereof opposite said ring-like element and forming a forwardly facing surface, and
(f) spring means disposed between said forwardly facing surface and the rearward end of said collet chuck to apply pressure to said collet chuck in the releasing direction thereof.

7. The collet chuck assembly of claim 6, further characterized by
a. said biasing means including a plug-like element received in the rear portion of the collet chuck and seated against a rearwardly facing shoulder thereof,
b. said plug-like element having a recess therein for the reception of said spring means.

8. The collet chuck assembly of claim 1, further characterized by
a. said spring means comprises a compressible coil spring
b. a forward convolution of said coil spring bearing against a rearwardly facing shoulder of said collet chuck and constituting said second reference means,
c. an integral extension of a rearward convolution of said coil spring extending forward along a radial slot of said collet chuck and comprising a connecting element, and
d. an integral extension of said connecting element engaging the front face of the lathe spindle and constituting the first reference element.

9. The collet chuck assembly of claim 8, further characterized by
a. said collet chuck having a forward, gripping portion of predetermined internal diameter and a rearward portion of larger internal diameter.
b. an annular shoulder extending between the internal walls of said forward and rearward portions,
c. the radial slots of said collet chuck extending lengthwise from the forward extremity thereof to a point rearward of said annular shoulder,
d. said second reference element being seated against said annular shoulder.

10. The collet chuck assembly of claim 9, further characterized by
a. the internal diameter of said coil spring being at least as large as the internal diameter of the forward portion of the collet chuck, whereby a workpiece gripped by said chuck may be at least partly received within the convolutions of said spring.

11. A self-releasing collet chuck assembly for use in combination with a lathe or the like of the type having a hollow spindle provided with a conically flared outer end, a draw tube slidably received in the spindle and engageable with the rear portion of the collet, comprising
a. a tubular collet chuck having a circumferentially intact rear portion and a radially slotted forward portion defining a plurality of clamping fingers,
b. the forward extremities of the clamping fingers being outwardly flared for cooperative engagement with the flared portions of the spindle, to effect clamping and releasing movements of said fingers in response to respective rearward and forward movements of the collet chuck,
c. spring means acting on the front face of the spindle and, in all operative positions of the collet chuck, urging the chuck forwardly in the spindle.

* * * * *